(12) United States Patent
Boyle et al.

(10) Patent No.: US 6,898,372 B2
(45) Date of Patent: May 24, 2005

(54) LAMP SYSTEM FOR CURING RESIN IN GLASS

(75) Inventors: Michael P. Boyle, Bend, OR (US); Randy L. Mackey, Bend, OR (US)

(73) Assignee: Glas-Weld Systems, Inc., Bend, OR (US)

( * ) Notice: Subject to any disclaimer, the term of this patent is extended or adjusted under 35 U.S.C. 154(b) by 55 days.

(21) Appl. No.: 10/410,890

(22) Filed: Apr. 9, 2003

(65) Prior Publication Data

US 2004/0202458 A1 Oct. 14, 2004

(51) Int. Cl.$^7$ .............................. H05B 3/00; B32B 31/26
(52) U.S. Cl. ...................... 392/427; 392/407; 156/94
(58) Field of Search .................... 392/427, 409, 392/407; 219/553; 425/12–13; 156/94, 275.5, 272.2; 250/504 H, 504 R, 493.1; 433/29, 32; 34/275, 266

(56) References Cited

U.S. PATENT DOCUMENTS

| | | | | |
|---|---|---|---|---|
| 3,549,861 A | * | 12/1970 | Trachtenberg et al. | 219/441 |
| 3,765,975 A | * | 10/1973 | Hollingsworth | 156/94 |
| 3,841,932 A | * | 10/1974 | Forler et al. | 425/12 |
| 4,047,863 A | * | 9/1977 | McCluskey et al. | 425/13 |
| 4,323,761 A | * | 4/1982 | Hubner | 392/409 |
| 4,731,541 A | * | 3/1988 | Shoemaker | 250/504 R |
| 5,088,015 A | * | 2/1992 | Baggio et al. | 362/217 |
| 5,095,639 A | * | 3/1992 | Slavin, Jr. | 34/282 |
| 5,591,460 A | * | 1/1997 | Wanstrath et al. | 425/12 |
| 6,007,658 A | * | 12/1999 | Calvert | 156/217 |
| 6,215,955 B1 | * | 4/2001 | Sloan | 392/383 |
| 6,524,433 B2 | * | 2/2003 | Sweeney, Jr. | 156/379.6 |
| 2002/0181947 A1 | * | 12/2002 | Cao | 392/409 |

FOREIGN PATENT DOCUMENTS

| | | | |
|---|---|---|---|
| JP | 61-58840 | * | 3/1986 |
| JP | 2002/75899 | * | 3/2002 |

OTHER PUBLICATIONS

AGRR Mag. May/Jun. 2001 "—Show Time in Vegas" 1 pg.
AGRR Mag. Jul./ Aug. 2001—"Atlas Windshield Repair Has the Cure"—1 pg.
Atlas Windshield Repair Website, printed 10/7/02—1 pg.
Atlas Windshield Repair—UV Brochure—undated—2 pg.

* cited by examiner

Primary Examiner—John A. Jeffery
(74) Attorney, Agent, or Firm—Schwabe, Williamson & Wyatt, P.C.

(57) ABSTRACT

The invention includes an apparatus for curing resin in glass. The lamp system includes a light bulb, where the light bulb has a substantially annular shape configured to accommodate a resin injection system. The apparatus also includes a bulb housing having a substantially annular shape that substantially corresponds to the shape of the light bulb to facilitate accommodation of the light bulb within the bulb housing. The bulb housing has a hole, proximately at a center of the substantially annular shape of the bulb housing, configured to accommodate the resin injection system. As a result, the light bulb and the bulb housing surrounding the resin injection system in a relatively tight diameter, thereby facilitating uniform curing of the resin.

28 Claims, 2 Drawing Sheets

LAMP SYSTEM FOR CURING RESIN IN GLASS

FIELD OF INVENTION

The present invention relates to a lamp system for curing resin in glass. More particularly, the present invention relates to a lamp system that facilitates uniform curing of the resin in the glass.

BACKGROUND OF THE INVENTION

Often times, glass may experience damage from an object impacting on the surface of the glass that causes not only surface damage, but also sub-surface damage. For example, a relatively small projectile hitting a glass windshield of a vehicle may cause a small surface damage that has most of the damage occurring sub-surface, and may be commonly known as a chip, a bulls-eye, and a star break, hereon out break. If untreated, the break may initiate a crack that may propagate through the glass, and eventually, the entire glass windshield may need to be replaced. However, if the break is timely treated, there is a good chance that the break may not initiate a crack resulting in preservation of the glass windshield. Because most of the damage may occur under the surface of the glass, treating the break may be difficult.

Commonly, treating a break in glass may involve delivering a type of resin in liquid form into the break, and allowing the resin to cure (i.e., harden). The resin may cure into a hardened structure within the break, thereby sealing the break to prevent further damage to the glass. Various methods may be utilized to deliver the resin into the break.

For example, a common method involves placing a resin injection system onto the surface of the glass, where the resin injection system may be held in place by suction cups on the resin injection system. Once the resin injection system is in place, commonly, the resin injection system facilitates injection of the resin in liquid form into the break. Injection of the resin may be achieved by forming a vacuum within the break, and subsequently, injecting the resin.

Once the resin is injected into the break, thereby filling the break, the resin may be cured to form a hardened structure within the break. Often times, curing the resin may involve exposing the resin to various types of lights such as ultraviolet (UV) light. A common method of exposing the resin to UV light involves a technician holding a lamp having a UV bulb, and exposing the resin to the lamp. Exposing the resin to the UV light may involve periodically moving the lamp around the resin injection system. Note, commonly, the resin injection system may be in place during the curing process to facilitate maximum filling of the break because the resin may reduce in volume as it cures. Removing the resin injection system during the curing process may cause voids in the break, thereby reducing the structural integrity of the glass. However, having the resin injection system in place during the curing process has some disadvantages.

For example, having the resin injection system in place during the curing process prevents substantially all of the resin being exposed to the lamp at one time. That is, as previously described, the lamp utilized to cure the resin is periodically moved around the resin injection system, thereby exposing portions of the resin to the lamp. Because portions of the resin may be exposed to the lamp, the resin may not cure uniformly (i.e., some portions of the resin may receive more concentrated light than other portions for varying durations of time). Non-uniform curing of the resin may affect the overall structural integrity of the hardened resin in the break.

In the example of a glass windshield on a vehicle, even providing electrical power to the lamp for curing the resin may pose some difficulties. For example, commonly, lamps utilized to cure the resin may require specific types of electrical power such as a specific voltage. Common sources of electrical power for the lamps may be a battery included in the vehicle and a common wall outlet. Because these common sources of electrical power differ, a lamp configured to receive electrical power from the battery may not receive electrical power from the common wall outlet, and vice versa.

BRIEF SUMMARY OF THE INVENTION

In a preferred embodiment, a lamp system includes a light bulb, where the light bulb has a substantially annular shape configured to accommodate a resin injection system. A bulb housing has a substantially annular shape that substantially corresponds to the shape of the light bulb to facilitate accommodation of the light bulb within the bulb housing. The bulb housing has a hole, proximately at a center of the substantially annular shape of the bulb housing, configured to accommodate the resin injection system. The light bulb and the bulb housing are mountable to the resin injection system and places the bulb and bulb housing in a relatively tight diameter, thereby facilitating uniform curing of resin injected into an outbreak.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention.

Reference throughout this specification to "one embodiment" or "an embodiment" means that a particular feature, structure, or characteristic described in connection with the embodiment is included in at least one embodiment of the invention. Thus, the appearances of the phrases "in one embodiment" or "in an embodiment" in various places throughout this specification are not necessarily all referring to the same embodiment or invention. Furthermore, the particular features, structures, or characteristics may be combined in any suitable manner in one or more embodiments.

The present invention is described as it may be associated with, by way of example, a glass windshield on a vehicle.

However, it should be appreciated by those skilled in the relevant art that the present invention may be practiced with any type of glass that may be treated with resin. Additionally, the present invention is described as it may be utilized to facilitate treatment of glass having a combination of surface and sub-surface damage. However, it should be appreciated by those skilled in the relevant art that the present invention may be utilized to facilitate treatment of a wide variety of damage that may be treated with resin such as chips, bulls-eyes, and star breaks, and so forth, hereon out break.

In various embodiments of the invention, a lamp system for curing resin in glass that facilitates uniform curing of the resin while a resin injection system is in place is described. This and other advantages will be evident from the disclosure.

Figure 1A:
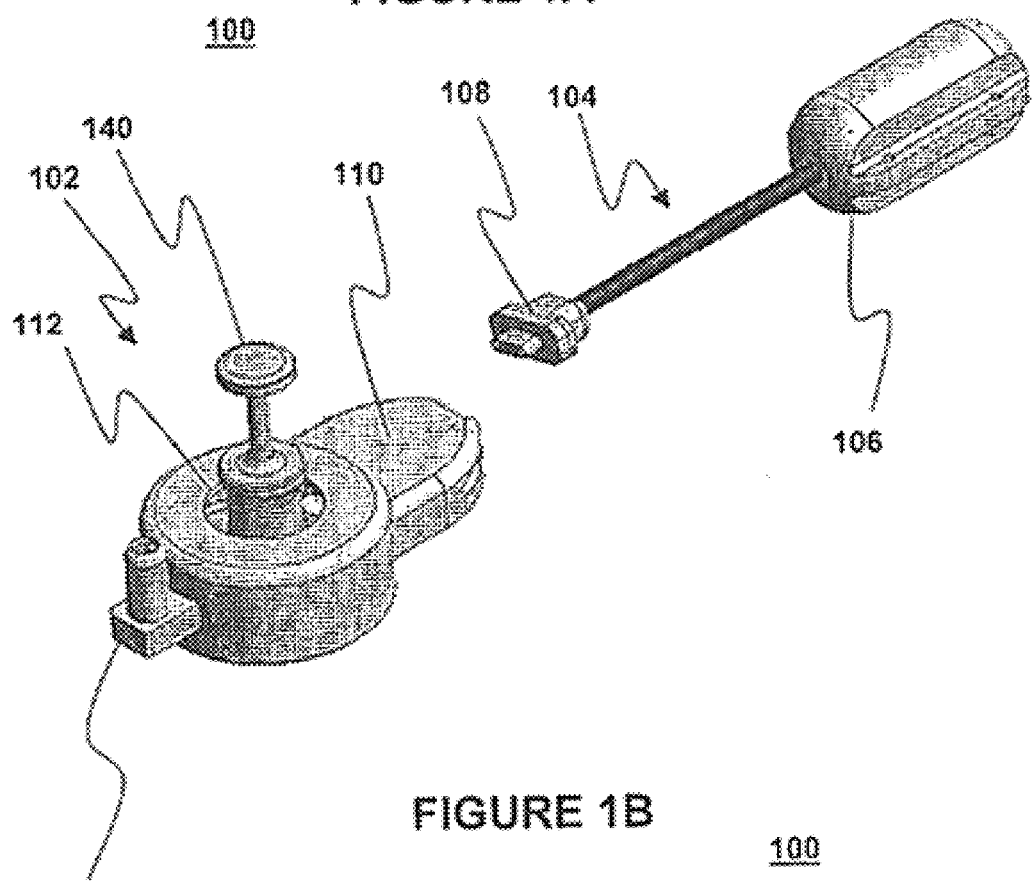
FIGS. 1A–B illustrate a lamp system for uniform curing resin in glass, in accordance with one embodiment of the present invention.
Figure 1B:
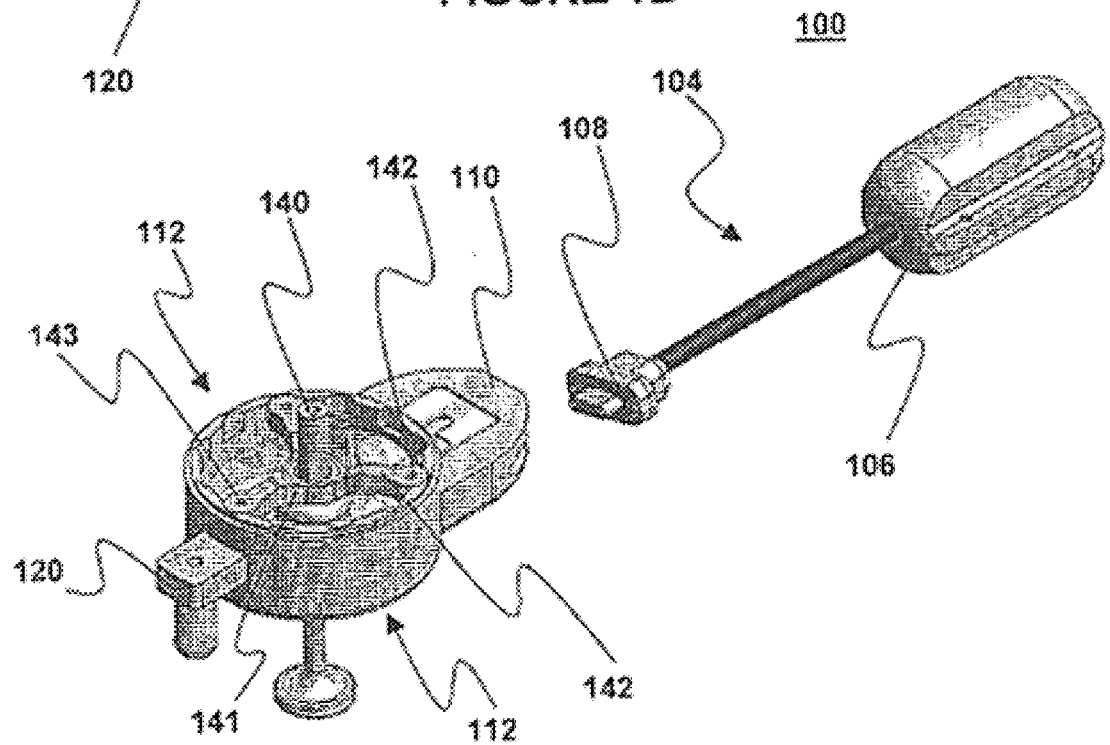

FIGS. 1A–B illustrate a lamp system for uniform curing resin in glass, in accordance with one embodiment of the present invention. Shown in FIG. 1A is a top perspective view of a lamp system 100, while FIG. 1B is a bottom perspective view of the lamp system 100. Both FIGS. 1A–B are illustrated to show various views of an embodiment of the present invention. Accordingly, for the purposes of describing the present invention as illustrated in both FIGS. 1A–B, references will be made to various features shown in both figures. Detailed features will be described subsequently.

Turning now to both FIG. 1A, lamp system 100 is shown having a housing, in one embodiment, a bulb housing 102 and a connectable power cord 104. The connectable power cord 104 has an integrated electrical power management device 106 and an electrical power coupler 108, and the bulb housing 102 has a handle 110. Additionally, the lamp system 100 includes a resin injection system 140.

As illustrated in FIGS. 1A–B, the bulb housing 102 has a substantially annular shape, and has a hole 112 proximately at a center of the bulb housing 102. As will be described in further detail, the shape of the bulb housing 102 corresponds to a shape of a light source, in one embodiment, a light bulb 210 (shown in FIG. 2) to facilitate accommodation of the light bulb 210 by the bulb housing 102. Accordingly, in one embodiment, the light bulb 210 also has a substantially annular shape. Additionally, in the illustrated embodiment, the hole 112 is configured to accommodate the resin injection system 140. That is, the bulb housing 102, having the bulb 210, is configured to integrate with the resin injection system 140, thereby facilitating curing of the resin with the resin injection system in place.

For example, shown in FIG. 1B, the resin injection system includes, in particular, a support structure 141 of the resin injection system 140. The support structure 141 of the resin injection system 140 may be utilized to mount the resin injection system 140 to glass. Accordingly, shown in FIG. 1B, the support structure 141 has support legs 142 that are laterally projected, the outer extreme of which define an annular shape. The support structure 141, in particular, the support legs 142 facilitate support of the resin injection system 140 relative to the break in the glass (i.e., as previously described, in a position substantially over the break). A number of attachment holes 143 that receive glass attachment devices such as, but not limited to, suction cups aid in holding the resin injection system 140 in place.

As will be described in further detail, in the embodiment illustrated in FIG. 1A–B, the bulb housing 102 interlocks with the support structure 141 of the resin injection system 140, thereby facilitating integration of the bulb housing 102 with the resin injection system 140.

The integrated electrical power management device 106 of the connectable power cord 104 facilitates use of one or more types of electrical power sources, in accordance with an embodiment of the present invention. That is, the integrated electrical power management device 106 provides electrical power to the bulb housing 102 (i.e., the light bulb 210) from various electrical power sources such as, but not limited to, a battery included in a vehicle (not shown) or an electrical wall outlet.

In one embodiment, the electrical power coupler 108 may be substantially similar between various electrical power sources. That is, the illustrated electrical power coupler 108 may represent an electrical power coupler from one or more types of electrical power sources. Accordingly, the handle 110 may be configured to couple the light bulb 210 to the connectable power cord 104 from the one or more types of electrical power sources.

For example, a connectable power cord may have an integrated electrical power management device to provide electrical power to the bulb housing 102 from a battery, while another connectable power cord may have an integrated electrical power management device to provide electrical power to the bulb housing 102 from a wall outlet. Both connectable power cords may have substantially similar electrical power couplers such as the electrical power coupler 108 of FIGS. 1A–B, thereby facilitating use of the bulb housing 102 with two different connectable power cords (i.e., connectable power cords for two different electrical power sources).

In the illustrated embodiment of FIGS. 1A–B, the bulb housing 102 is shown having an attachment structure 120. The attachment structure 120 may be utilized to facilitate attachment of the bulb housing 102 to the glass. As alluded to previously, the resin may be cured without the resin injection system 140 in place over the break, but this may result in voids within the break (i.e., structural defects). Accordingly, as will be described in detail below, the bulb housing 102 is preferably held in place by the resin injection system 140, whereby the resin injection system 140 may continually provide resin into the break to compensate for volumetric change of the resin as it cures.

As a result, a lamp system for curing resin may be integrated with a resin injection system, thereby advantageously facilitating uniform curing of the resin even while a resin injection is in place over a break during the curing process. Additionally, the lamp system may be utilized with one or more types of electrical power sources with ease.

A resin injection system with which the lamp system 100 may be integrated and utilized may be of a vacuum type resin injection system such as, but not limited to, a Pro-Vac 2000 resin injection system of Glas-Weld Systems, Inc., of Bend, Oregon. Accordingly, an example of a size for the hole 112 may be approximately 1.875 inches in diameter. Further, the overall size of the bulb housing 102 may have example dimensions of approximately 4.25 inches in overall diameter and approximately 1.90 inches in overall height.

The electrical power management device 106 may be of a transformer type device such as, but not limited to, a transformer having a rectifier to convert alternating current (AC) to direct current (DC). Alternatively, electrical power management device 106 may be a transformer configured to change-various electrical powers. That is, the electrical management device 106 may be a step up transformer or a step down transformer, in accordance with an embodiment.

The lamp system 100 for curing resin in glass is described by way of curing resin in glass having damage in the form of a break. However, it should be appreciated by those skilled in the art that the lamp system 100 may be utilized to treat various other forms of damage in glass within the scope of the present invention. For example, the lamp system 100 may be utilized to treat various types of cracks and surface defects in glass.

Figure 2:
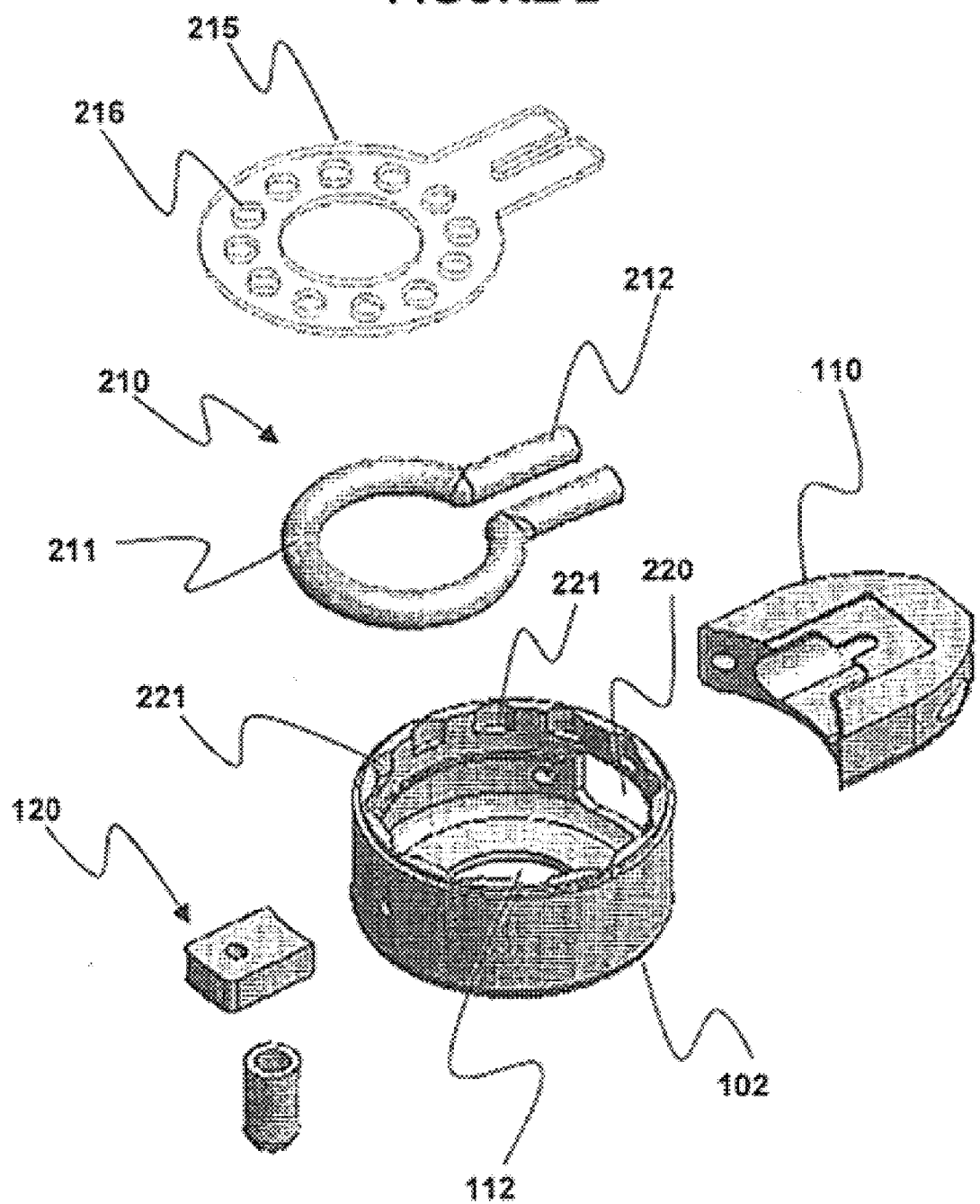
FIG. 2 illustrates a lamp system for curing resin in glass in further detail, in accordance with one embodiment of the present invention.

FIG. 2 illustrates a lamp system for curing resin in glass in further detail, in accordance with one embodiment of the present invention. Illustrated in FIG. 2 is an exploded view of the bulb housing 102 (shown in FIGS. 1A–B) without the resin injection system 140 in place. Briefly referring back to FIGS. 1A–B, and in particular, FIG. 1B, the bulb housing 102 may be assembled as shown.

Turning now to FIG. 2, the bulb housing 102 includes the handle 110, a light bulb 210, and a bulb shield 215. Additionally, as previously described, the illustrated embodiment of FIG. 2 also shows the bulb housing 102 having the attachment structure 120.

As shown, the light bulb 210 has a substantially annular shape. In particular, the light bulb 210 has a substantially annular portion 211 and a substantially straight portion 212. The substantially annular portion 211 is accommodated within the bulb housing 102, while the substantially straight portion is accommodated within the handle 110. As previously described, the substantially annular portion 211 provides light in all directions to the resin within a break for curing resin and defines a circular path within the annular shape of the support legs 142 and the bulb housing 102 surrounding the support legs 142, while the resin injection system 140 (shown in FIGS. 1A–B) is in place.

In the illustrated embodiment, the light bulb 210 is configured to surround the resin injection system 140 in a relatively close diameter. For example, referring to the previous example of the Pro-Vac 2000 resin injection system, the light bulb 210 may have an overall diameter dimension of approximately 3.25–3.50 inches. Because the light bulb 210 is configured to surround the resin injection system 140 in a relatively close diameter, the lamp system 100 also advantageously facilitates uniform curing by facilitating improved curing of a center of the break. That is, light for curing is provided in a tighter radius around the break, thereby providing concentrated curing light to the center of the break.

The substantially straight portion 212 facilitates coupling of the light bulb 210 with electrical power. In one embodiment, the light bulb may be a fluorescent light bulb configured to provide ultraviolet (UV) light at a predetermined intensity value such as, but not limited to, UV light having a wavelength between 350 and 380 nanometers.

Shown in FIG. 2, the bulb housing 102 has the hole 112 proximately at the center of the bulb housing 102. The bulb housing 102 has a side wall hole 220 to facilitate pass through of the substantially straight portion 212 of the light bulb 210 into the handle 110. In the embodiment of FIG. 2, the bulb housing 102 has a number of interlocking features 221 located around the inside of the bulb housing 102. The interlocking features 221 facilitate integration of the bulb housing 102 with the resin injection system 140. For example, as shown in FIG. 1B, the interlocking features 221 may correspond to features on the resin injection system 140 such as, but not limited to, the support structure 141 of the resin injection system 140 (i.e., support legs 142). Accordingly, the bulb housing 102 may be mounted on the resin injection system 140. Because the interlocking features 221 are located around the bulb housing 102, the interlocking features 221 facilitate integration of the bulb housing 102 with the resin injection system 140 in various rotational positions about the resin injection system 140.

Additionally, the bulb housing 102 may be made of a metallic material to facilitate durability and reflectiveness of the inside where the bulb is located. An example of a metallic material may be a light weight type material, such as, but not limited to, aluminum.

Bulb shield 215 is shown also having a substantially annular shape that substantially corresponds to the shape of the light bulb 210. The bulb shield 215 is configured to provide protection for the light bulb 210 while facilitating maximum use of the light at the predetermined intensity, in accordance with one embodiment. The bulb shield 215 is shown having a number of holes 216. The number of holes 216 facilitate optimum use of the light intensity. For example, in the embodiment of the light bulb 210 providing UV light, the bulb shield 215 may be made of a plastic having a predetermined amount of UV inhibitor, which may correspond to the type of plastic, to prevent discoloration of the bulb shield 215 after prolonged exposure to the UV light. For example, the bulb shield 215 may be made of a butyrate plastic having a relatively small amount of UV inhibitor. Because the butyrate plastic has a UV inhibitor, having the number of holes 216 facilitates maximum use of the UV light (i.e., areas where light is not inhibited). Further, the bulb shield 215 provides protection to the light bulb 210 (i.e., reduces risk of damage to the light bulb 210 within the bulb housing 102).

As a result, a lamp system has a bulb housing and a light bulb in an annular shape to facilitate integration with a resin injection system, thereby facilitating uniform curing of the resin. Furthermore, the bulb housing has features that protect the bulb and interlock with the resin injection system.

As previously alluded to, an example of utilization of the present invention includes the following, whereby a break in glass may be treated. For example, the resin injection system 140 may be placed on a glass having a break such as, but not limited to, star break. In particular, the support structure 141 of the resin injection system 140 is attached onto the glass via suction cups (not shown). Once the break is filled with liquid resin, the lamp system 100 may be placed over the resin injection system 140 via the hole 112. The interlocking features 221 may correspond to the support structure 141 on the resin injection system 140 (i.e., interlocks onto the resin injection system). The light bulb 210, having the predetermined intensity and type, is provided to cure the resin within the break. As the liquid resin cures, resin from the resin injection system 140 may be continually provided to reduce the occurrences of voids within the break (i.e., as the resin cures, the volume of the resin decreases). Additionally, as previously described, the lamp system 100 may be advantageously used with various types of power sources. In order to protect the light bulb, the bulb shield 215 is configured with a number of holes 216 to facilitate maximum use of the light.

Those skilled in the art will recognize that modifications and variations may be made without departing from the true spirit and scope of the invention. The invention is therefore not to be limited to the embodiments described and illustrated.

Thus, a lamp system for curing resin in glass that facilitates uniform curing of the resin while a resin injection system is in place has been described.

What is claimed is:

1. A system for treating a break in glass comprising:
   a resin injection system having laterally projected support legs, the outer extreme of which define a substantially annular shape, the support legs supporting the resin injection system in an operable position relative to the break; and a lamp system, the lamp system having a housing and a light source mounted inside the housing, the housing ad the light source having a substantially annular shape, the lamp system mounted on the resin injection system whereby the light source defines a circular path within the annular shape of the support legs and the housing surrounding the support legs.

2. The system of claim 1, wherein the light source comprises a light bulb, the light bulb having a substantially annular shape, and configured to provide a predetermined type of light having a predetermined intensity value.

3. The system of claim 1, wherein the housing comprises a bulb housing, the bulb housing having a substantially annular shape that substantially corresponds to the shape of the light source to facilitate accommodation of the light source within the bulb housing, and having a hole, proximately at a canter of the bulb housing, configured to accommodate the resin injection system.

4. The system of claim 1 further comprising a connectable power cord, the connectable power cord having an integrated electrical power management device to provide electrical power to the light source from one or more types of electrical power sources.

5. The system of claim 4, wherein the lamp system housing includes a handle for receiving the connectable power cord, said connectable power cord comprises a connectable power cord having the integrated electrical power management device located at a predetermined distance from the handle.

6. The system of claim 4, wherein the one or more types of electrical power sources comprise of at least one of a battery included in a vehicle and an electrical wall outlet.

7. The system of claim 1 further comprising a bulb shield, the bulb shield having a substantially annular shape that substantially corresponds to the shape of the light source and the housing, and configured to provide protection for the light source while facilitating maximum use of the light source at a predetermined intensity value.

8. The system of claim 7, wherein the bulb shield comprises a bulb shield made of a plastic having a predetermined amount of ultraviolet (UV) light inhibitor.

9. The system of claim 8, wherein the bulb shield comprises a bulb shield made of butyrate plastic.

10. The system of claim 1, wherein the light source comprises a fluorescent light source configured to provide ultraviolet (UV) light at a predetermined intensity value.

11. The system of claim 10, wherein the fluorescent light source comprises a fluorescent light source configured to provide (UV) light having a wavelength between 350 and 380 nanometers.

12. The system of claim 1, wherein the housing comprises a housing having interlocking features to facilitate integration with a support structure included in the resin injection system.

13. The system of claim 1, wherein the housing comprises a housing made of a metallic material to facilitate reflectiveness of an inside of the housing.

14. An apparatus comprising:

a light bulb, the light bulb having a substantially annular shape configured to accommodate a resin injection system including a support structure having at least one radially projected support leg for supporting the system on a glass surface; and a bulb housing having a substantially annular shape that substantially corresponds to the shape of the light bulb to facilitate accommodation of the light bulb within the bulb housing, and having an open bottom for projecting light onto said glass surface, and further having a top and a hole in the top, proximately at a center of the substantially annular shape of the bulb bossing to facilitate operation of the injection system, said housing configured to accommodate the resin injection system, and the light bulb overlying the at least one radially projected support leg of the support structure resulting in the annular light bulb having a relatively close diameter that is radially inward of the radial projection of said at least one radially projected support leg.

15. The apparatus of claim 14 further comprising a bulb shield, the bulb shield having a substantially annular shape that substantially corresponds to the shape of the light bulb, and configured to provide protection for the light bulb while facilitating maximum use of the light at the predetermined intensity value.

16. The apparatus of claim 15, wherein the bulb shield comprises a bulb shield made of a plastic having a predetermined amount of ultraviolet (UV) light inhibitor.

17. The apparatus of claim 16, wherein the bulb shield comprises a bulb shield made of butyrate plastic.

18. The apparatus of claim 14, wherein the light bulb comprises a fluorescent bulb configured to provide ultraviolet (UV) light at the predetermined intensity value.

19. The apparatus of claim 18, wherein the fluorescent bulb comprises a fluorescent bulb configured to provide (UV) light having a wavelength between 350 and 380 nanometers.

20. A system for treating a break in glass comprising:

a resin injection system;

a lamp system, the lamp system having a substantially annular shape configured to accommodate the resin injection system, said lamp system comprising:

a light bulb, the light bulb having a substantially annular shape, and configured to provide a predetermined type of light having a predetermined intensity value, a bulb housing, the bulb housing having a substantially annular shape that substantially corresponds to the shape of the light bulb to facilitate accommodation of the light bulb within the bulb housing, and having a hole, proximately at a center of the substantially annular shape of the bulb housing, configured to accommodate a resin injection system;

a connectable power cord, the connectable power cord having an integrated electrical power management device to provide electrical power to the lamp system from one or more types of electrical power sources;

a handle coupled to the bulb housing, the handle configured to receive the connectable power cord;

said bulb housing having interlocking features to facilitate integration with a support structure included in the resin injection system.

21. The system of claim 20 further comprising a bulb shield, the bulb shield having a substantially annular shape that substantially corresponds to the shape of the light bulb and the bulb housing, and configured to provide protection for the light bulb while facilitating maximum use of the tight at the predetermined intensity value.

22. The system of claim 21, wherein the bulb shield comprises a bulb shield made of a plastic having a predetermined amount of ultraviolet light inhibitor.

23. The system of claim 22, wherein the bulb shield comprises a bulb shield made of butyrate plastic.

24. The system of claim 20, wherein the light bulb comprises a fluorescent bulb configured to provide ultraviolet (UV) light, at the predetermined intensity value.

25. The system of claim 24, wherein the fluorescent bulb comprises a fluorescent bulb configured to provide (UV) light having a wavelength between 350 and 380 nanometers.

26. The system of claim 20, wherein the bulb housing comprises a bulb housing made of a metallic material to facilitate reflectiveness of an inside of the bulb housing.

27. The system of claim 20, wherein the connectable power cord comprises a connectable power cord hang the integrated electrical power management device located at a predetermined distance from the bulb housing.

28. The system of claim 20, wherein the connectable power cord comprises a connectable power cord having an integrated electrical power management device configured to convert electrical power at a first level to electrical power at a second level.

* * * * *

UNITED STATES PATENT AND TRADEMARK OFFICE
CERTIFICATE OF CORRECTION

PATENT NO. : 6,898,372 B2  
DATED : May 24, 2005  
INVENTOR(S) : Boyle et al.

Page 1 of 1

It is certified that error appears in the above-identified patent and that said Letters Patent is hereby corrected as shown below:

<u>Column 4,</u>  
Line 63, "change-various electrical…" should read -- change various electrical… --.

<u>Column 7,</u>  
Line 19, "…at a canter…" should read -- …at a center… --.

<u>Column 8,</u>  
Line 5, "…bulb bossing…" should read -- …bulb housing… --.  
Line 61, "…of the tight" should read -- …of the light --.

<u>Column 9,</u>  
Line 11, "…cord hang…" should read -- …cord having… --.

Signed and Sealed this

Twenty-third Day of May, 2006

JON W. DUDAS  
*Director of the United States Patent and Trademark Office*